STUART G. FORBES
JOHN S. MARTINEZ
BURNAM I. FRIEDMAN
INVENTORS

Oct. 12, 1965     S. G. FORBES ETAL     3,210,926
IONIC PROPULSION SYSTEMS

Filed June 18, 1962     2 Sheets-Sheet 2

STUART G. FORBES
JOHN S. MARTINEZ
BURNAM I. FRIEDMAN
               INVENTORS

BY

ATTORNEY

3,210,926
IONIC PROPULSION SYSTEMS
Stuart G. Forbes, Palos Verdes, Burnam I. Friedman, San Pedro, and John S. Martinez, Redondo Beach, Calif., assignors to TRW Inc., a corporation of Ohio
Filed June 18, 1962, Ser. No. 203,200
12 Claims. (Cl. 60—35.5)

The present invention relates to low thrust ionic propulsion systems for space vehicles and more particularly to improvements in propulsion systems of the general type discussed in an article entitled, "Electrostatic Propulsion," Proceedings of the IRE, volume 48, Number 4, April 1960, pages 477 through 491.

A further and perhaps more detailed description of ionic propulsion systems which provides a background from which the present invention proceeds may be found in Space Technology, edited by Howard Seifert, John Wiley and Sons, Inc., New York (1959). In chapter 9 of the Space Technology publication, it is shown that the ratio of the power plant mass to the propellant material mass is the independent variable which determines the attainable exhaust velocity of an electrostatic propulsion engine. More particularly, at pages 9–10 through 9–12 of the Space Technology publication it is shown that an optimum performance space mission vehicle should have a total mass to payload mass ratio $M_O/M_L$ on the order of one to five, and a propellant mass to power supply apparatus mass ratio $M_P/M_W$ of the order of one. That is, it can be shown that overall performance of the vehicle is optimum if the mass of propellant carried is approximately equal to the mass of apparatus required to produce and electrically accelerate the ionized propellant particles. It will be appreciated that the electrostatic propulsion propellant supply and the mass of the power supplying apparatus in a practical space vehicle for interplanetary flight represent a substantial fraction of the weight which must be boosted into orbit. Use of system parameters which minimize propellant wastage can spell the difference between practical operability and failure of a particular ionic propulsion system design. Likewise, efficient use of power supplying apparatus can minimize the gross weight of such apparatus and can thereby make feasible certain space missions which otherwise could not be accomplished.

The overall performance of ionic propulsion systems of the type generally described in the aforementioned publications is governed to a large extent by the specific power (power per unit mass, e.g., kw./kg.) of its power supply system. In such propulsion systems as proposed heretofore, a major fraction of the weight has been associated with the apparatus for supplying electrical power to the accelerator or ion engine rather than with the ion engine, per se. Furthermore, the feasibility of employing ionic propulsion systems to perform specific interplanetary missions depends upon the possibility of devising power supply apparatus having higher specific power characteristics than have been available heretofore. Most existing power supply systems or apparatus for use with ionic propulsion engines convert heat, which is supplied by nuclear energy, into an electricity with efficiencies ranging between five and ten percent. The electrical energy is then supplied to the ionic propulsion engine for use in heating the propellant emitter and the propellant as well as for electrostatically accelerating the propellant ions. At pages 9–20 and 9–21 of the Space Technology publication, Langmuir has demonstrated that a substantial fraction of the entire power consumption of a practical ionic propulsion engine is dissipated by radiation losses. These losses often exceed forty percent of the power supplied to the ion engine from the power supply apparatus and hence, are responsible for a large fraction of the weight of the power supply apparatus which is required to be carried by the vehicle. Provision of power supply apparatus having substantially higher efficiencies for supplying the energy which is necessarily dissipated as radiation losses would greatly improve the overall performance of a given propulsion system design.

Accordingly, it is an object of the present invention to provide an improved arrangement for supplying heat energy to the ionic propulsion engine in low thrust propulsion systems.

It is a further object of the present invention to provide an improved ion engine for propulsion of space vehicles in which the electrical power required for production and acceleration of high velocity particles is substantially reduced.

It is an additional object of the present invention to provide an improved ion engine for space vehicles in which those components which are required to operate at extreme temperatures are continuously and directly supplied with heat energy by means of structurally contiguous radioactive heat generating elements.

It is still another object of the present invention to provide an improved ion engine for space vehicles in which the ion emitting means is continuously heated by a radio-isotope heat emitting material which is intimately associated with the ion emitting material.

It is a still further object of the present invention to provide an improved engine of the type described in which the material from which the ions-to-be-emitted are drawn is continuously maintained at operative temperature by heat energy directly supplied from a quantity of radio-isotope heat generating material sufficient to offset the heat loss by radiation to the environment.

Briefly, the foregoing objectives and features of our invention are accomplished in accordance with a preferred embodiment by providing an ion emitter structure which operates by adsorption and contact ionization of an alkali metal propellant material to generate a supply of ionic particles to be accelerated. In an apparatus of the type described, it is well known that such an emitter structure must operate at temperatures of the order of 1200° C. or higher. In accordance with our invention, the thermal energy to maintain such temperatures, even in the presence of substantial heat loss by radiation, is provided by thermal energy generating means structurally disposed in heat conductive association with the ion emitter and including a quantity of radioactive material such as a preselected radioisotope. Preferably, the quantity should be sufficient to produce directly, by atomic decay, the heat energy necessary to maintain the desired emitter operating temperature.

The foregoing and other objects and features of our invention will be more apparent and better understood from the following description taken with the accompanying drawings, throughout which like reference characters indicate like parts, which drawings form a part of this application and in which.

Figure 1:
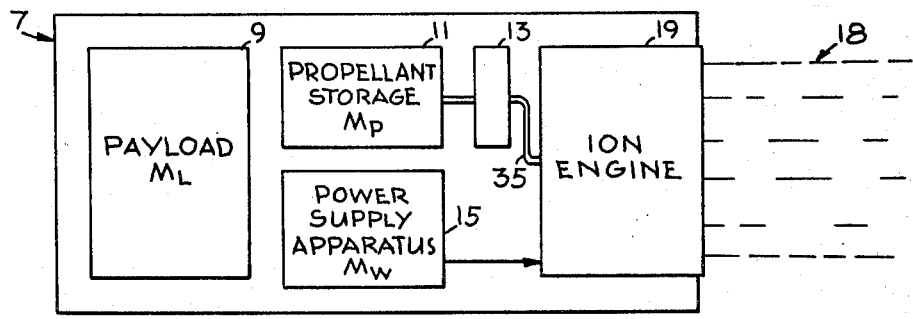
FIGURE 1 is a diagrammatic illustration of a space vehicle of the type to which the present invention is applicable.

To establish a basis for discussion of the environmental circumstances in which the present invention is particularly advantageous, there is shown diagrammatically in FIGURE 1 a space vehicle 7 of the ionic propulsion type which normally includes a payload having a mass $M_L$ and a propellant storage means or tank 11 for carrying a quantity of an alkali metal propellant such as cesium, rubidium, or potassium, which propellant initially would have a mass $M_P$. The propellant from tank 11 is normally conducted to a propellant superheating means or boiler 13 from which it is fed, through a propellant feed tube 35 to the inlet of an ion engine structure 19, as an alkali metal vapor having a pressure of about one millimeter of mercury absolute. The ion engine 19 receives the propellant material and, preferably, ionizes the same by surface or contact ionization on a body of hot tungsten in a manner to be described more fully hereinafter. After being emitted as charged ions from the tungsten emitter of the ion engine structure 19, the propellant ions are electrostatically accelerated by utilization of electrical power derived from a power source or power supply apparatus 15 having a mass $M_W$. After acceleration and neutralization by injection of appropriate quantities of free electrons, the propellant material is expelled from the vehicle in the form of a plasma beam 18 as indicated at the right in FIGURE 1.

Figure 2:
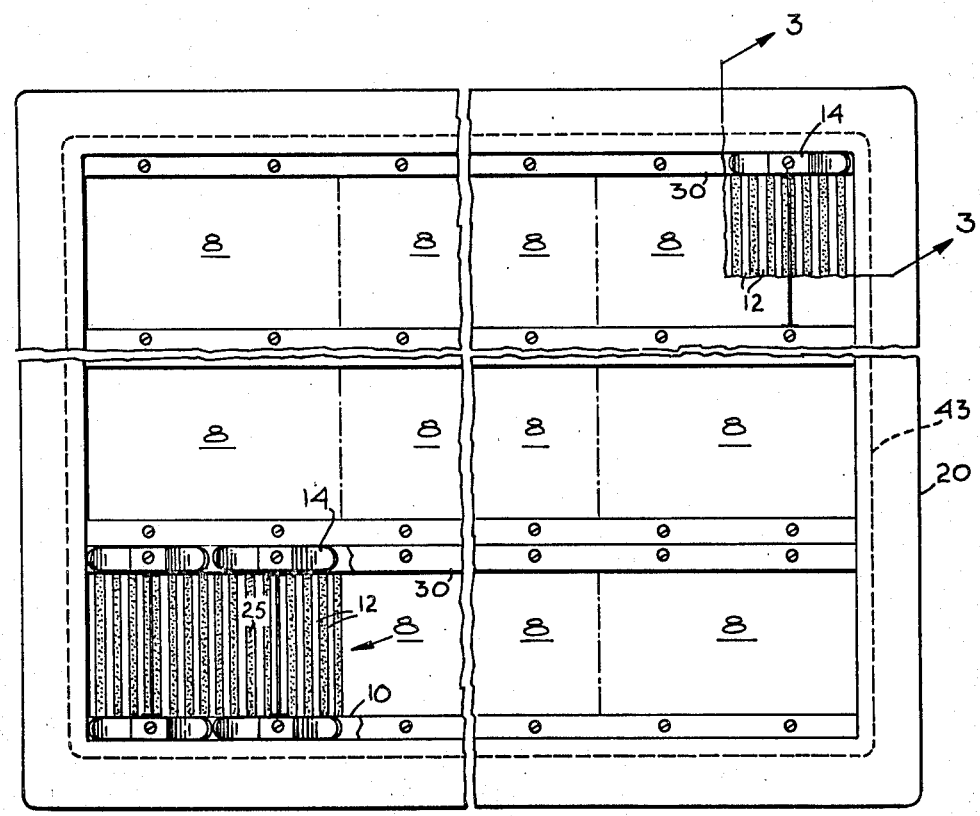
FIGURE 2 is a rear end view of the ion engine of the vehicle illustrated in FIGURE 1.
Figure 3:
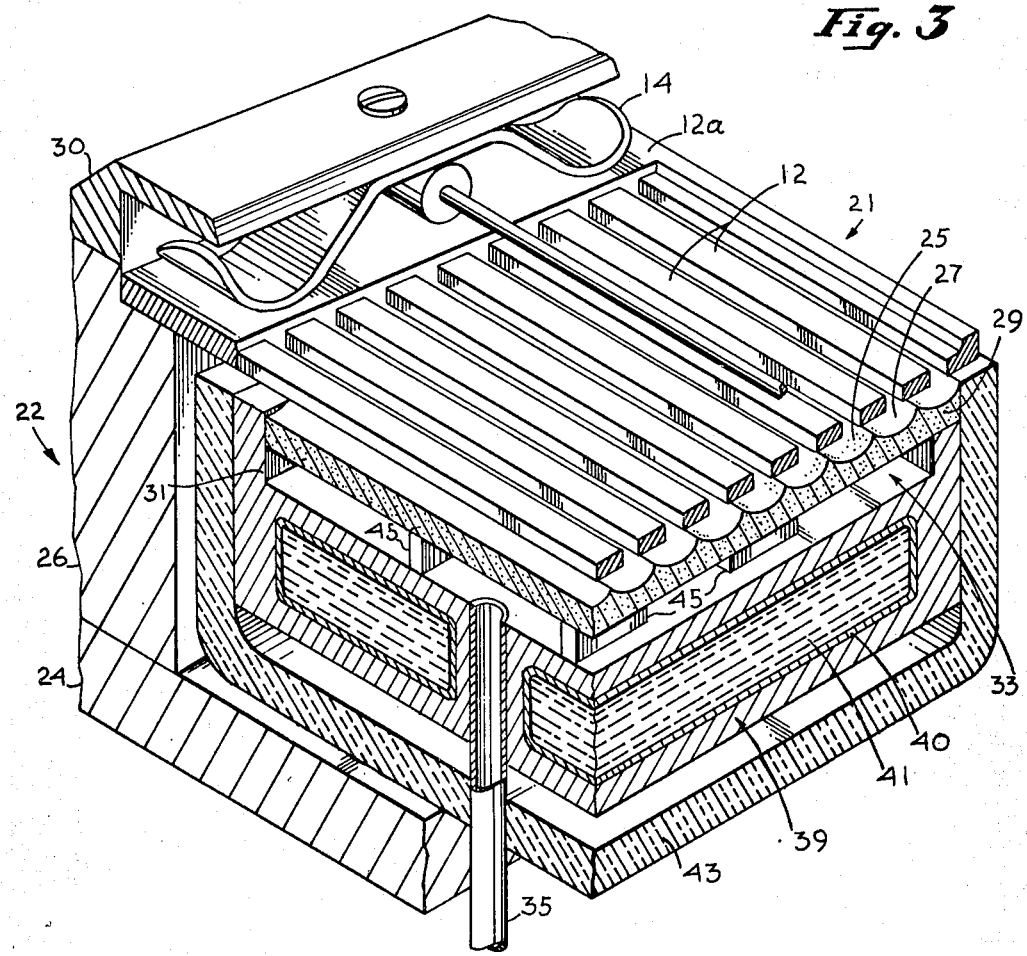
FIGURE 3 is a cutaway perspective view of a portion of the ion engine structure depicted in FIGURE 2.
Figure 3:
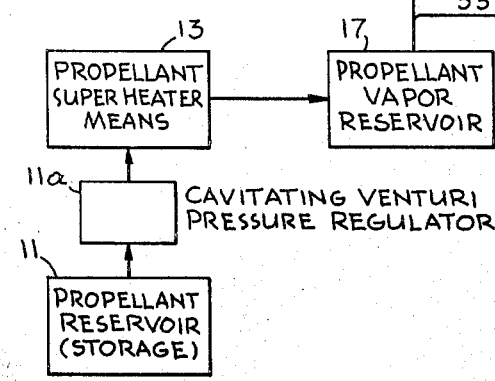

As shown in FIGURES 2 and 3, the ion engine 19 comprises essentially a porous tungsten plug or body 29 having an exposed surface 27 which functions as a means for surface ionization and release of alkali ions to the space between the tungsten plug 29 and a plurality of accelerator grid bars 12 which are arranged in parallel in a plane spaced a few millimeters from the surface 27. The engine structure as depicted in FIGURE 3 represents a cutaway perspective taken generally along the lines 3—3 of an engine module 8 as indicated in FIGURE 2. The ion engine, as a whole, preferably comprises a plurality of the engine modules 8, each of which may be a few inches square and all of which are arrayed in a single plane, so that the current of the exhaust ion beam 18 corresponds to the sum of the areas of the individual engine modules 8 multiplied by the average emitter current density. The tungsten plug 29 preferably is formed by sintering from tungsten powder so that it has a substantially uniform porosity with the total pore volume being approximately twenty percent of the body volume. The use of an emitter structure formed of porous tungsten enables the alkali metal vapor propellant to be fed from a plenum chamber 33 adjacent the inside surface of the plug 29 through the pores of the plug 29 to the exterior or exposed surface 25. Transpiration of the propellant vapor through the pores of the plug 29 at an appropriate rate causes the alkali atoms to be adsorbed on the emittive surface 25 in a manner such that each alkali atom loses an electron to the tungsten when it is adsorbed. As shown in FIGURE 3, the propellant material is initially fed from the propellant storage reservoir 11 through a cavitating venturi pressure regulator 11a which serves to stabilize the pressure of the propellant vapor in subsequent portions of the system. From the regulator 11a, the propellant passes into a propellant superheater means or boiler 13 where it is heated to a temperature appropriate for application to the plenum chamber 33 and the porous emitter plug 29. The boiler 13 passes the propellant into a vapor reservoir 17 from which the propellant vapor passes to the propellant feed tube 35 of the illustrated ion engine module and also by way of the lines 35a, 35b, and 35c to a plurality of other similar ion engine modules. The plenum chamber 33 adjacent the interior surface of the emitter plug 29 is enclosed or formed by closure member 31 having a generally rectangularly cup shape and having a plurality of support bosses 45 to space the emitter plug 29 from the main body of the closure member 31.

As best illustrated in FIGURE 2, the entire ion engine structure 19 is enclosed in an outer casing 20 of insulative material for minimizing heat loss from the ion emitter assembly to other components of the vehicle. The entire engine structure is supported and enclosed by support member 22 having wall portions 26 and a base portion 24 extending around the exterior of the insulative layer 43. The accelerating grid bars 12 are supported at their ends by grid rails 12a and are held in position by grid clamping members 14 which are distributed along, secured to, and supported from a grid retaining flange 30. The retaining flange 30 may, of course, be secured to and supported from the wall portions 26. Positioned between the closure member 31 and the base member 24 and preferably interiorly of the insulative layer 43 there is provided a thermal energy producing means or heater element 39 which preferably comprises a heat conductive casing member 40 and a quantity of radioactive isotope material such as $Ce^{144}O_2$ or $Pu^{238}$. It will be understood, of course, that various other heat generating isotope materials which are either liquids or solids may be utilized providing that they have the capability of producing the desired quantity of thermal energy and providing that they have a radioactive half life commensurate with the duration of the proposed vehicle mission. In a preferred structural embodiment of the present invention, the isotope casing member 40 has a generally annular form so that it surrounds the propellant feed tube 35 and provides heat energy substantially equal to all elemental areas of the closure member 31. Alternatively, of course, the closure member 31 and the isotope casing member 40 may be constructed of a single metallic member with the isotope material sealed therewithin.

The structure and system shown in FIGURE 3 and the operation thereof can be more fully appreciated by considering in some detail the physical basis for and the critical operational parameters of ionic propulsion systems. The optimum expulsion velocity for an ion engine requires accelerating voltages ranging from a few kilovolts down to less than one thousand volts for some applications, provided that singularly charged elemental ions are used. In order to obtain high propulsive efficiencies, the power expended in forming an ion at the exposed surface 25 of the tungsten emitter body must be a small fraction of the power required to accelerate that ion. Ideally, an ion source with an energy consumption prior to acceleration of about one hundred electron volts per ion or less is desired. Values in this range are experimentally obtainable by the ionization of alkali metals on high work function surfaces such as tungsten. An important consideration in the use of surface or contact ionization is that if the surface work function of the emitter body is higher than the ionization potential of the alkali atoms, the atoms will lose an electron to the tungsten when they are adsorbed on the surface. After a period of residence on the emitting surface and providing that the accelerating electrical field adjacent the emitting surface is sufficiently high, the alkali atoms evaporate as positive ions. If the work function of the tungsten emitter body becomes lower than the ionization potential of the alkali propellant, the ionization process is much less effective and almost all of the alkali metal will evaporate as neutral atoms and, therefore, be wasted so far as propulsive effect is concerned.

Since the effect of absorbed alkali is to reduce the work function of tungsten, the ion emitting state can be maintained only when the tungsten surface is slightly covered (less than one-half percent) with absorbed alkali. Below this degree of surface coverage, the rate of ion evaporation is almost exactly equal to the rate of arrival of atoms from the vapor. The rate of ion emission and, hence, the current density per unit area and the propulsive effect can be increased if the vapor pressure of the alkali vapor in the porous tungsten is increased; but, increasing the vapor pressure also causes the surface coverage on the tungsten to rise. Thus, for a given temperature of the surface 25 there is a maximum ion emission current density. Attempts to increase the current beyond that maximum current density or to reduce the temperature of the tungsten emitter body 29 would cause the surface 25 to change to the non-ionized atom-emitting condition. We have found that operation of an ion engine, as described heretofore, at temperatures lower than about 1200° C., when using cesium propellant, results in severe deterioration of the contact ionization phenomena. When the temperature is too low, the cesium propellant evaporates from the surface 25 as neutral atoms and is lost into space without being accelerated. Under such circumstances, there is, of course, an excessive propellant consumption with no increase in propulsive effect. Thus, it is seen that an efficient electrostatic ion propulsion system necessarily employs an emitter structure which operates at temperatures of the order of 1200° C. or higher. Moreover, from considerations of FIGURES 1 and 3, it will be appreciated that the ions released from the emitting surface 25 are required to proceed therefrom between the spaced grid bars 12 and thence into deep space along the exhaust beam 18. For such generation, acceleration, and explusion of the propellant ions, the ion producing and accelerating structures and particularly the emitting surface 25 are necessarily exposed to the deep space environment in which the vehicle operates. These structures unavoidably radiate substantial quantities of heat energy into that environment. As stated heretofore, that heat loss is a primary feature in reducing th overall power efficiency of the propulsion system. If that heat energy were conventionally supplied by electrically heating the emitting structure or the tungsten plug 29, with the electrical energy being supplied from the usual power supply apparatus 15 which, per se, has an efficiency of perhaps five to ten percent, the overall efficiency of the propulsion system would be seriously degraded with the result that the range of feasible space missions would be correspondingly limited. By virtue of the arrangement of the present invention in which the emitter structure, including the tungsten plug 29 and the plenum chamber 33, is directly heated by nuclear isotope heat generating means, a substantial fraction of the power required to operate the ion engine is supplied directly rather than being derived from the power supply apparatus 15. Accordingly, the mass of the power supply apparatus 15 may be correspondingly reduced. As noted heretofore, optimum performance of a space vehicle is obtained when the propellant mass to power supply mass ratio $M_P/M_W$ is of the order of one. Thus, reduction of the mass of the power supply apparatus 15 enables a corresponding reduction in the mass of propellant $M_P$ which must be carried by the vehicle for a given mission. Reduction of $M_W$ and $M_P$ enables substantial increase in the mass $M_L$ of the payload 9.

In accordance with the preferred embodiment of our invention, the radioisotope material 41 should be selected from among those which are either liquids or solids having negligible vapor pressure at the desired operating temperature of the ion emitting assembly. $Ce^{144}O_2$ is preferred in that it is a refractory having a melting point above 1900° C. and capable of generating at least seven watts per gram. $Ce^{144}O_2$ has a half life of two hundred eighty five days which would tend to limit its application to mission durations of a year or less. For space vehicles intended for longer missions, one of a variety of the more expensive alpha and beta emitting isotopes can be utilized. One preferred example is $Pu^{238}$ which has a negligible vapor pressure at the temperatures in question and has a half life of eighty-six years. Other high temperature radioisotopes having relevant characteristics sufficiently like those of $Ce^{144}O_2$ and $Pu^{238}$ are the following: curium 244 ($Cm^{244}$); curium 242 ($Cm^{242}$); polonium 210 ($Po^{210}$); and cesium 137 ($Cs^{137}$). Considering that features such as mission duration, allowable radiation fields in the spacecraft, and limitations of on board power generating apparatus are involved in selection of the optimum isotope for a given space mission, such selection is dependent on the functional and structural parameters of the particular vehicle and its intended purpose. Accordingly, such selection is left to the skill of workers in the art. Similarly, persons skilled in the art will recognize that isotope heat generation decreases with time in accord with the half life of the particular material. Therefore, for some specific space missions it may be desirable to use, in conjunction with the isotope heating arrangement of the present invention, a variable area radiator such as those described in Energy Conversion Systems Reference Handbook, volume XI, September 1960; WADD Technical Report 60–699.

While the present invention has been illustrated and described with reference to a certain preferred embodiment only, it will be obvious to those skilled in the art that it is not so limited but is susceptible of various changes and modification without departing from the spirit and scope thereof.

We claim as our invention:

1. In an ion emitting structure for use in electrostatic propulsion systems:
  a base support member including a base portion and wall portions defining an aperture therebetween;
  a layer of low thermal conductivity insulating material disposed within said aperture adjacent said base and wall portions;
  a porous tungsten emitter plug positioned in said aperture and spaced from said base portion;
  means including a structure defining a plenum chamber adjacent the interior surface of said emitter plug for introducing propellant material to said interior surface and enabling transpiration of the same through said plug for ionic emission from the outer surface thereof; and
  heating means, disposed between said base portion and the structure which defines said plenum chamber, for continuously and directly supplying sufficient heat energy to said emitter plug to offset the effects of thermal radiation from the outer surface thereof so that the same is maintained at a temperature commensurate with high efficiency emission of propellant ions from said outer surface, said heating means comprising a heat conductive member contiguous to the structure which defines said plenum chamber and a sufficient quantity of radioisotope material confined within said heat conductive member to produce by atomic decay the heat energy which is supplied to said emitter plug.

2. In an ion emitting structure for use in electrostatic propulsion systems:
  a base support member including a base portion and wall portions defining an aperture therebetween;
  a porous tungsten emitter plug positioned in said aperture and spaced from said base portion;
  means including a member defining a plenum chamber adjacent the interior surface of said emitter plug for introducing of propellant material to said interior surface and permitting transpiration of the same through said plug for ionic emission from the outer surface thereof; and
  heating means disposed between said base portion and said member for continuously and directly supplying sufficient heat energy to said emitter plug to offset the effects of thermal radiation from the outer surface thereof so that the same is maintained at a temperature commensurate with high efficiency emission of propellant ions from said outer surface, said heating means comprising a heat conductive member contiguous to said member and a sufficient quantity of radioisotope material confined within said heat conductive member to produce by atomic decay the heat energy which is supplied to said emitter plug.

3. The apparatus of claim 2 in which said radioisotope material is selected from the group comprising $Ce^{144}O_2$, $Pu^{238}$, $Cm^{244}$, $Cm^{242}$, $Po^{210}$, and $Cs^{137}$.

4. The apparatus of claim 2 in which said isotope material containing heat conductive member has a toroidal shape defining a central aperture and in which said propellant material is supplied to said plenum chamber by way of a propellant conduit means which traverses said central aperture.

5. The apparatus of claim 2 in which the propellant material supplied to said plenum chamber is an alkali metal selected from the group comprising cesium, rubidium, and potassium.

6. In an electrostatic propulsion system of the contact ionization type for producing thrust by electrostatic acceleration and expulsion of electrically charged particles, and in which emitter means for adsorption and subsequent evaporation of an alkali metal propellant material is utilized for generating a supply of said particles to be accelerated, and in which said emitter means is required to be maintained at a temperature such that the work function of the material of the emitter means is higher than the ionization potential of said alkali metal propellant in order to minimize evaporation of said propellant as neutral atoms, and in which a substantial portion of the active propellant evaporating surface of said emitter means is subject to cooling by radiation into the lower temperature system environment, the combination of:
 a metallic body having a substantially uniform porosity and having one surface adapted and positioned for evaporation of adsorbed alkali metal propellant;
 closure means adjacent the opposite surface of said body and defining a plenum chamber therebetween into which the vapor form of said alkali metal propellant may be introduced for transpiration through the pores of said body and adsorption by said one surface; and
 thermal energy producing means disposed in heat conductive association with said body and including a quantity of radioactive material sufficient for directly producing and supplying by atomic decay the heat energy necessary to at least counteract said cooling.

7. In a low thrust propulsion system for space vehicles in which thrust is produced by electric acceleration and expulsion of alkali metal ions:
 a porous metallic body for adsorption and subsequent evaporation of an alkali metal propellant material to produce a supply of ions to be accelerated, said body being characterized in that efficient production of ions requires maintenance of said body at temperature levels above a critical temperature at which the work function of said body is higher than the ionization potential of said propellant material;
 first and second opposite and generally planar surfaces formed on said metallic body with said first surface being positioned to lose heat by radiation into space;
 ion acceleration mechanism positioned to provide an electrostatic field adjacent said first surface for propelling ions away from the same;
 closure means adjacent said second surface and shaped to provide in cooperation with said second surface, a closed plenum chamber;
 means for supplying alkali metal vapor to said chamber at a pressure sufficient for transpiration of said vapor through the pores of said body; and
 means including a quantity of radioisotope material positioned in heat conductive association with one of said means for directly producing heat energy at a rate commensurate with maintenance of said body at temperature levels exceeding said critical temperature.

8. The apparatus of claim 7 in which said radioisotope material is selected from the group comprising $Ce^{144}O_2$, $Pu^{238}$, $Cm^{244}$, $Cm^{242}$, $Po^{210}$, and $Cs^{137}$.

9. The apparatus of claim 7 in which the propellant material supplied to said plenum chamber is an alkali metal selected from the group comprising cesium, rubidium, and potassium.

10. An electrostatic propulsion ion engine comprising, in combination:
 means for supplying an ionizable propellant material;
 a vessel having walls defining a plenum chamber for containing said material and having at least one substantial wall portion formed of a metal having a large plurality of pores which extend between the interior and exterior of the vessel and enable transpiration of said material therethrough;
 a heating element in contiguous thermal contact with said vessel, said element including a sufficient quantity of radioactive isotope to directly supply by atomic decay the thermal power necessary to maintain said vessel at a predetermined elevated temperature; and
 acceleration means adjacent the exterior of said wall portion for electrostatically accelerating transpired particles of said propellant material outwardly therefrom.

11. In an electrostatic propulsion system of the type which produces thrust by electrostatic acceleration and expulsion of electrically charged particles, the combination of:
 a vessel containing an ionizable substance;
 said vessel having a wall portion characterized by minute pores which extend from the interior to the exterior of the vessel and enable adsorptive transpiration of said ionizable substance therethrough; and
 means including a quantity of radioactive material disposed in contiguous heat conductive association with said vessel for directly supplying by atomic decay the heat energy necessary to maintain said porous wall portion at an elevated temperature.

12. In an ion engine:
 means for supplying an ionizable substance;
 a vessel for containing a quantity of said substance, and having a wall portion formed of a porous material characterized by the ability to adsorptively transpirate said ionizable substance to the exterior of said wall portion; and
 heating means disposed in heat conductive association with said vessel for maintaining said vessel above a predetermined minimum operational temperature;
 said heating means including a sufficient quantity of radioisotope material to provide, by atomic decay, the thermal power required to offset cooling by thermal radiation from said vessel.

References Cited by the Examiner
UNITED STATES PATENTS

| | | | |
|---|---|---|---|
| 2,765,414 | 10/56 | Gendler et al. | 204—193.2 |
| 3,014,154 | 12/61 | Ehlers et al. | 60—35.5 |
| 3,050,652 | 8/62 | Baldwin | 313—63 |

MARK NEWMAN, *Primary Examiner.*

SAMUEL LEVINE, *Examiner.*